United States Patent
Choi et al.

(10) Patent No.: US 9,354,439 B2
(45) Date of Patent: May 31, 2016

(54) 3D IMAGE DISPLAY APPARATUS INCLUDING ELECTROWETTING LENS ARRAY AND 3D IMAGE PICKUP APPARATUS INCLUDING ELECTROWETTING LENS ARRAY

(71) Applicant: SAMSUNG ELECTRONICS CO., LTD., Suwon-si (KR)

(72) Inventors: Kyu-hwan Choi, Yongin-si (KR); Yun-hee Kim, Seoul (KR); Yong-joo Kwon, Yongin-si (KR); Jung-mok Bae, Seoul (KR); Yoon-sun Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 330 days.

(21) Appl. No.: 13/894,940

(22) Filed: May 15, 2013

(65) Prior Publication Data

US 2014/0132724 A1 May 15, 2014

(30) Foreign Application Priority Data

Nov. 13, 2012 (KR) ........................ 10-2012-0128263

(51) Int. Cl.
*H04N 13/02* (2006.01)
*G02B 26/00* (2006.01)
(Continued)

(52) U.S. Cl.
CPC ............... *G02B 26/005* (2013.01); *G02B 3/14* (2013.01); *G02B 27/2214* (2013.01); *G02B 27/2278* (2013.01); *H04N 13/0235* (2013.01); *H04N 13/0406* (2013.01); *H04N 13/0495* (2013.01)

(58) Field of Classification Search
USPC ............... 348/46, 42, 44, 40, 51, 52, 80, 135, 348/208.11, 222.1, 224.1, 291, 345, 360, 348/751, 749; 349/1, 5, 9, 15, 33, 201; 359/15, 298, 463, 619, 629, 665, 666, 359/316, 462, 621, 630; 353/31
See application file for complete search history.

(56) References Cited

U.S. PATENT DOCUMENTS

| 7,515,340 B1 | 4/2009 | Shiu et al. |
| 2005/0179871 A1* | 8/2005 | Kobayashi ............. G02B 5/005 353/31 |

(Continued)

FOREIGN PATENT DOCUMENTS

| CN | 101059600 A | 10/2007 |
| CN | 201177669 Y | 1/2009 |

(Continued)

OTHER PUBLICATIONS

Communication, dated Dec. 10, 2013, issued by the European Patent Office in counterpart European Patent Application No. 13187881.1.

(Continued)

*Primary Examiner* — Jefferey Harold
*Assistant Examiner* — Mustafizur Rahman
(74) *Attorney, Agent, or Firm* — Sughrue Mion, PLLC

(57) ABSTRACT

Provided are an integral imaging type 3-dimensional (3D) image display apparatus and a 3D image pickup apparatus for increasing a depth by using an electrowetting lens array. The 3D image display apparatus includes a display panel and an electrowetting lens array having an electrically adjustable variable focal distance. The 3D image display apparatus displays a plurality of images having different depths on different focal planes and thus a depth of a 3D image by using one display panel.

11 Claims, 4 Drawing Sheets

(51) Int. Cl.
*G02B 27/22* (2006.01)
*G02B 3/14* (2006.01)
*H04N 13/04* (2006.01)

(56) References Cited

U.S. PATENT DOCUMENTS

| | | | |
|---|---|---|---|
| 2007/0058094 A1* | 3/2007 | Kuiper et al. | 349/1 |
| 2007/0121213 A1* | 5/2007 | Tseng et al. | 359/628 |
| 2007/0242068 A1* | 10/2007 | Han et al. | 345/427 |
| 2008/0039937 A1* | 2/2008 | Obrebski | 623/6.32 |
| 2008/0198292 A1 | 8/2008 | Marra et al. | |
| 2008/0252556 A1 | 10/2008 | Tseng et al. | |
| 2008/0316302 A1 | 12/2008 | Vos et al. | |
| 2009/0290079 A1* | 11/2009 | Evans et al. | 349/18 |
| 2010/0123007 A1* | 5/2010 | Wittenberg et al. | 235/454 |
| 2010/0232000 A1* | 9/2010 | Futterer et al. | 359/9 |
| 2011/0032442 A1* | 2/2011 | van Aerle et al. | 349/38 |
| 2011/0128392 A1* | 6/2011 | Kumagai | 348/208.5 |
| 2011/0310291 A1* | 12/2011 | Kato et al. | 348/354 |
| 2012/0008056 A1* | 1/2012 | Gong | 349/15 |
| 2012/0044571 A1* | 2/2012 | Mukawa | G02B 27/0103 359/630 |
| 2012/0099205 A1 | 4/2012 | Bae et al. | |
| 2012/0105955 A1* | 5/2012 | Takai | G02B 3/0075 359/463 |
| 2013/0038922 A1* | 2/2013 | Kirita | G02B 26/005 359/316 |

FOREIGN PATENT DOCUMENTS

| | | |
|---|---|---|
| JP | 2006-267386 A | 10/2006 |
| KR | 10-1057769 B1 | 8/2011 |
| WO | 96/41227 A1 | 12/1996 |
| WO | 2009-050273 A2 | 4/2009 |

OTHER PUBLICATIONS

Smith, Neil R., et al., "Fabrication and Demonstration of Electrowetting Liquid Lens Arrays," IEEE, Journal of Display Technology, vol. 5, No. 11, Nov. 1, 2009, pp. 411-413.

Duparré, J.W., et al., "Topical Review: Micro-optical artificial compound eyes," Bioinspiration & Biomimetics, Institute of Physics Publishing, vol. 1, No. 1, Mar. 1, 2006, pp. R1-R16.

Kim et al., "Depth-enhanced integral imaging display system with electrically variable image planes using polymer-dispersed liquid-crystal layers", Applied Optics, Jun. 20, 2007, 8 pages total, vol. 46 No. 18, Optical Society of America, Seoul, KR.

Kim et al., "Depth-enhanced three-dimensional integral imaging by use of multilayered display devices", Applied Optics, Jun. 20, 2006, 10 pages total, vol. 45 No. 18, Optical Society of America, Seoul, KR.

* cited by examiner

3D IMAGE DISPLAY APPARATUS INCLUDING ELECTROWETTING LENS ARRAY AND 3D IMAGE PICKUP APPARATUS INCLUDING ELECTROWETTING LENS ARRAY

CROSS-REFERENCE TO RELATED APPLICATION

This application claims priority from Korean Patent Application No. 10-2012-0128263, filed on Nov. 13, 2012, in the Korean Intellectual Property Office, the disclosure of is are incorporated herein in its entirety by reference.

BACKGROUND

1. Field

Apparatuses consistent with exemplary embodiments relate to a 3-dimensional (3D) image display apparatus and a 3D image pickup apparatus, and more particularly, to an integral imaging type 3D image display apparatus for increasing a depth by using an electrowetting lens array and a 3D image pickup apparatus.

2. Description of the Related Art

There is a need, in various fields such as entertainment, gaming, advertising, medicine, education, military, etc., for a 3-dimensional (3D) image display apparatus which further realistically and effectively displays an image. Therefore, various techniques for displaying a 3D image have been suggested, and various types of 3D image display apparatuses have been commercialized.

A 3D image display apparatus is classified as an glasses type or a glassesless type. The glasses type devices are classified as polarization glasses type devices and shutter glasses type devices. The stereoscopy type of a glassless type device is classified as a lenticular type device, which uses a plurality of cylindrical lens arrays, or a parallax barrier type device having a plurality of barriers and a plurality of openings. However, the above-described devices use binocular parallax. Therefore, the above-described devices are limited in that they cannot provide an increased number of viewpoints. Thus, the depth perception of a user and the users' eye focus may disagree to force the viewer feel fatigue. Also, only horizontal parallax is provided, and vertical parallax is not provided.

A holographic method and an integral imaging method have each been suggested as a 3D image display methods which cause a viewer's depth perception to agree with the focus of the viewer's eyes and provide full parallax. The holographic method provides a 3D image by interference between a signal beam including an image signal and a reference beam. In the holographic method, a high-priced laser having high coherence is used, and an optical system for forming an image is precisely arranged. Also, noise such as speckles is commonly generated on an image display surface.

The integral imaging method displays a 3D image by using a fly-eye lens array including a plurality of micro-lens arrays. According to the integral imaging method, color is easily displayed, a continuous viewing angle is provided, and the structure of the optical system is simple. However, the depth perception provided by the 3D image is limited, and the viewing angle is narrow. Therefore, various studies are in progress. For example, there is suggested a method of arraying a plurality of display panels displaying images having different depths at predetermined intervals and a method of using a plurality of polymer dispersed liquid crystal (PDLC) films and projectors arrayed at predetermined intervals.

SUMMARY

One or more exemplary embodiments provide a direct imaging type 3-dimensional (3D) image display apparatus for increasing depth perception by using an electrowetting lens array and a 3D image pickup apparatus.

Additional exemplary aspects will be set forth in part in the description which follows and, in part, will be apparent from the description, or may be learned by practice of the presented embodiments.

According to an aspect of an exemplary embodiment, a 3-dimensional (3D) image display apparatus includes; a display panel including a plurality of pixels; and an electrowetting lens array having an electrically adjustable variable focal distance. The electrowetting lens array may include a plurality of electrowetting lens cells 2-dimensionally arrayed in a fly-eye lens array.

The display panel sequentially may be configured to display at least two images having different depths. The electrowetting lens array may be configured to sequentially project the at least two images at at least two different focal distances corresponding to the depths of the at least two images.

When the display panel displays a first image having a first depth, the electrowetting lens array may project the first image at a first focal distance. When the display panel displays a second image having a second depth, the electrowetting lens array may project the second image at a second focal distance. When the display panel displays a third image having a third depth, the electrowetting lens array may project the third image at a third focal distance.

Each of the electrowetting lens cells may include: lower and upper transparent substrates; vertical barriers erected on an upper surface of the lower transparent substrate and defining a plurality of spaces therebetween; a plurality of electrodes disposed on sidewalls of the vertical barriers; a dielectric layer covering the plurality of electrodes; a hydrophobic coating formed on a surface of the dielectric layer; a plurality of wiring lines disposed on an upper surface of the lower transparent substrate and respectively electrically connected to the plurality of electrodes; a common electrode disposed on a lower surface of the upper transparent substrate; and non-polar and polar liquids disposed in the space enclosed by the vertical barriers.

The vertical barriers may be disposed in a mesh form and may define a plurality of spaces therein. The plurality of electrodes may include first and second electrodes, and third and fourth electrodes, wherein the first and second electrodes are disposed on vertical barriers extending in a first direction, such that the first and second electrodes face each other across the space, and the third and fourth electrodes are disposed on vertical barriers extending in a second direction perpendicular to the first direction such that the third and fourth electrodes face each other across the space.

The dielectric layer may have a multilayer structure formed of a plurality of different materials.

The dielectric layer may include a first layer formed of a fluoropolymer CYTOP™ and adjacent to the hydrophobic layer, a second layer formed of $HfO_2$, and a third layer formed of Mo and adjacent to the electrodes.

A thickness of the first layer may be about 300 Å, a thickness of the second layer may be about 2000 Å, and a thickness of the third layer may be about 2000 Å.

The plurality of electrowetting lens cells of the electrowetting lens array may correspond to a plurality of pixels of the display panel on a one-to-one basis.

According to an aspect of another exemplary embodiment, the present invention, a 3D image pickup apparatus includes: an image pickup device including a plurality of optical sensing pixels; and an electrowetting lens array having an electrically adjustable variable focal distance. The electrowetting lens array may include a plurality of electrowetting lens cells 2-dimensionally arrayed in a fly-eye lens array.

The electrowetting lens array may be configured to sequentially change the focal distance and form an image of an object on the image pickup device. The image pickup device may be configured to capture a plurality of images of different depths of the object at different focal distances.

The plurality of electrowetting lens cells of the electrowetting lens array may correspond to a plurality of optical sensing pixels of the image pickup device.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
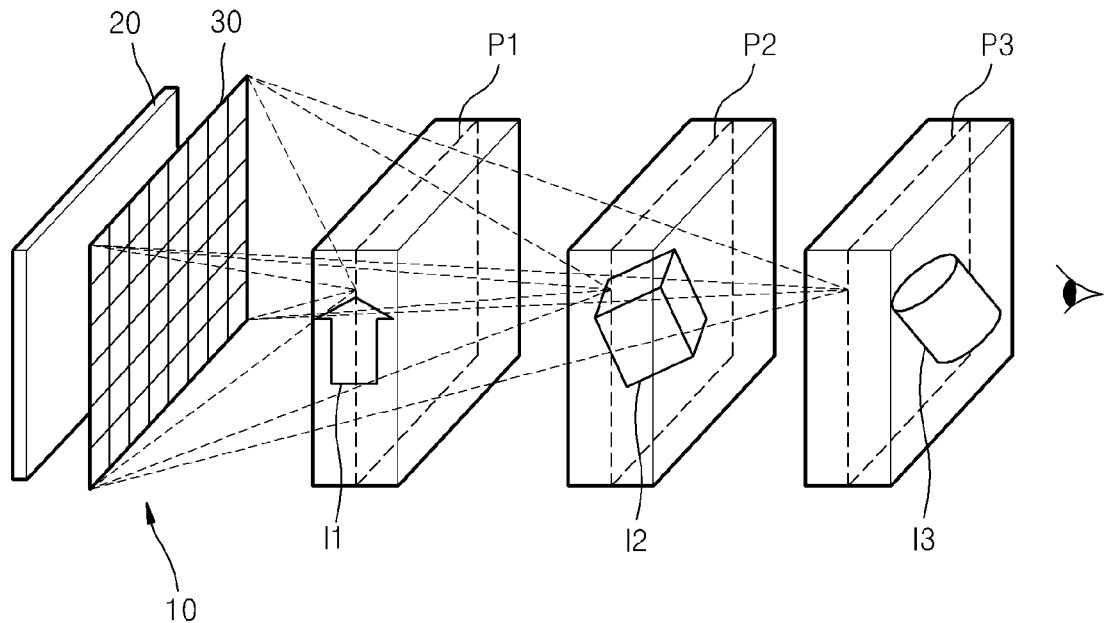
FIG. 1 is a schematic view illustrating a structure and an operation of a 3-dimensional (3D) image display apparatus according to an exemplary embodiment.

A 3-dimensional (3D) image display apparatus and a 3D image pickup apparatus including an electrowetting lens array will now be described in detail with reference to the attached drawings. Like reference numerals in the drawings denote like elements, and thus their description will be omitted. In the drawings, the thicknesses of layers and regions are exaggerated for clarity. It will be understood that there is no intent to limit embodiments to the particular forms disclosed, but on the contrary, embodiments are to cover all modifications, equivalents, and alternatives falling within the scope of the invention. It will also be understood that when a layer is referred to as being "on" another layer or substrate, it can be directly on the other layer or substrate, or intervening layers may also be present.

FIG. 1 is a schematic view illustrating a structure and an operation of a 3-dimensional (3D) image display apparatus 10 according to an exemplary embodiment.

Referring to FIG. 1, the 3D image display apparatus 10 includes a display panel 20 and an electrowetting lens array 30. The electrowetting lens array 30 has an electrically adjustable variable focal distance. Here, the display panel 20 may include any type of apparatus which displays images. For example, the display panel 20 may be any of various types of panels such as a liquid crystal display (LCD), an organic light-emitting diode (OLED), a plasma display panel (PDP), and so on. Also, the display panel 20 may be a projector or a polymer dispersed liquid crystal (PDLC).

The electrowetting lens array 30 includes a plurality of micro electrowetting lens cells 2-dimensionally arrayed in a fly-eye lens array. An electrowetting lens uses an electrowetting phenomenon and has a variable focal distance to electrically control an interface between non-polar liquid such as oil and polar liquid such as water in order to adjust a focal distance.

Figure 2:
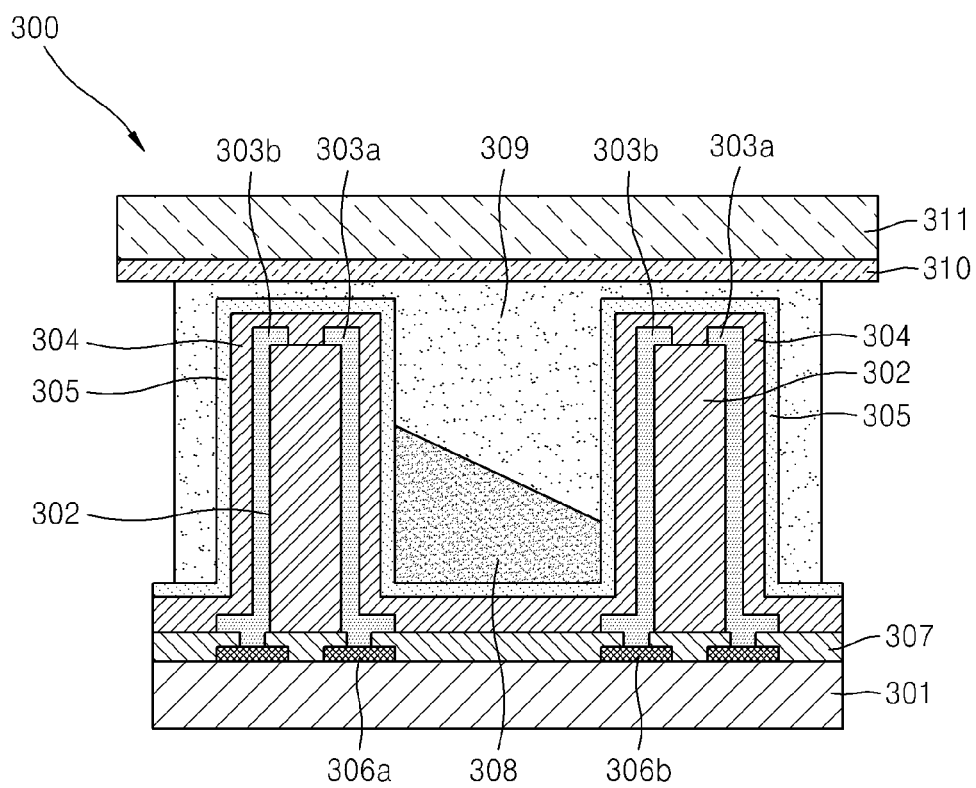
FIG. 2 is a schematic cross-sectional view illustrating a structure of an electrowetting lens cell of an electrowetting lens array of FIG. 1.

FIG. 2 is a schematic cross-sectional view illustrating a structure of an electrowetting lens cell 300 of the electrowetting lens array 30 of FIG. 1. Referring to FIG. 2, the electrowetting lens cell 300 includes lower and upper transparent substrates 301 and 311, vertical barriers 302, first and second electrodes 303a and 303b, a dielectric layer 304, a hydrophobic coating 305, first and second lines 306a and 306b, a common electrode 310, non-polar liquid 308, and polar liquid 309. The lower and upper transparent substrates 301 and 311 face each other, and the vertical barriers 302 are erected on the lower transparent substrate 301. The first and second electrodes 303a and 303b are disposed on opposite sidewalls of the vertical barriers 302. The dielectric layer 304 fully covers the first and second electrodes 303a and 303b, and the hydrophobic coating 305 fully covers the dielectric layer 304. The first and second lines 306a and 306b are arrayed on an upper surface of the lower transparent substrate 301 and are respectively electrically connected to the first and second electrodes 303a and 303b. The common electrode 310 is disposed on a lower surface of the upper transparent substrate 311. The non-polar liquid 308 and the polar liquid 309 are disposed in a space enclosed by the vertical barrier 302.

Two vertical barriers 302 are disposed in FIG. 2 but the vertical barriers may be a single structure formed in a mesh form, defining a plurality of small spaces between the vertical barriers 302. The first and second electrodes 303a and 303b may be respectively disposed on opposite sidewalls of a vertical barrier 302. As shown in FIG. 2, the first and second electrodes 303a and 303b may face each other across a space defined between the vertical barriers 302. The second electrode disposed on the left sidewall of the left vertical barrier 302 and the first electrode 303a disposed on the right sidewall of the right vertical barrier 302 belong to other adjacent electrowetting lens cells 300.

Figure 3:
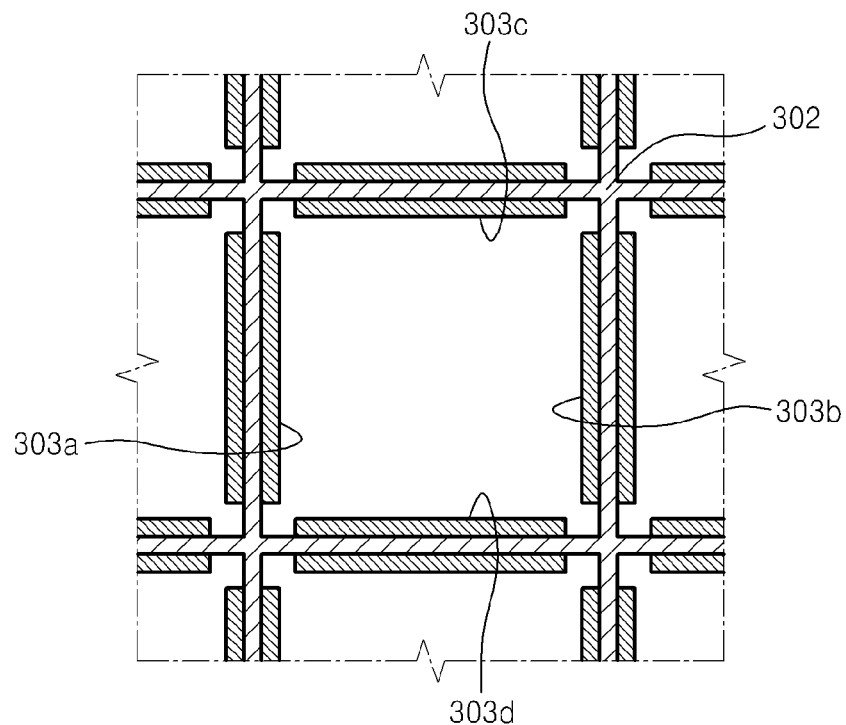
FIG. 3 is a schematic view illustrating an arrangement relationship between a barrier and an electrode of FIG. 2.

Two electrodes 303a and 303b are illustrated in FIG. 2, but four electrodes may be disposed along the four sides of a rectangular space. For example, as shown in FIG. 3, the vertical barriers 302 may form a mesh form defining a plurality of rectangular spaces, and four electrodes 303a through 303d may be respectively disposed in each of the plurality of rectangular spaces. In other words, the first and second electrodes 303a and 303b may be disposed on opposite sides of vertical barriers 302, which extend in a first direction, and third and fourth electrodes 303c and 303d may be disposed on opposite sides of vertical barriers 302 which extend in a second direction, perpendicular to the first direction.

In FIG. 2, the first line 306 electrically connected to the first electrode 303a and the second line 306b electrically connected to the second electrode 303b are illustrated. However, third and fourth lines (not shown), respectively connected to the third and fourth electrodes 303c and 303d, may also be disposed on the lower transparent substrate 301. The first and second lines 306a and 306 may be disposed in the first direction like the first and second electrodes 303a and 303b, and the third and fourth lines may be disposed to extend in the second direction like the third and fourth electrodes 303c and 303d.

A passivation layer 307 is formed on the first and second lines 306a and 306b to allow the first and second lines 306a and 306 to contact only the first and second electrodes 303a and 303b, respectively. The passivation layer 307 covers the first and second lines 306a and 306b except parts of the first and second lines 306a and 306b which are connected to the first and second electrodes 303a and 303b. In this case, the vertical barriers 302, the dielectric layer 304, etc. may be formed on the passivation layer 307.

The dielectric layer 304 covering the first and second electrodes 303a and 303b electrically insulates the first and second electrodes 303a and 303b from the non-polar and polar liquids 308 and 309 disposed in the space. Although not shown, the dielectric layer 304 may be formed on all surfaces of the vertical barriers 302 to fully cover the third and fourth electrodes 303c and 303d. The dielectric layer 304 fully covers the first through fourth electrodes 303a through 303d and extends to the bottom of the space. The hydrophobic coating 305 is formed on a surface of the dielectric layer 304 to allow the polar liquid 309 to easily form a predetermined contact angle at its interface with the non-polar liquid 308. The hydrophobic coating 305 fully covers the dielectric layer 304 and extends to the bottom of the space.

Figure 4:
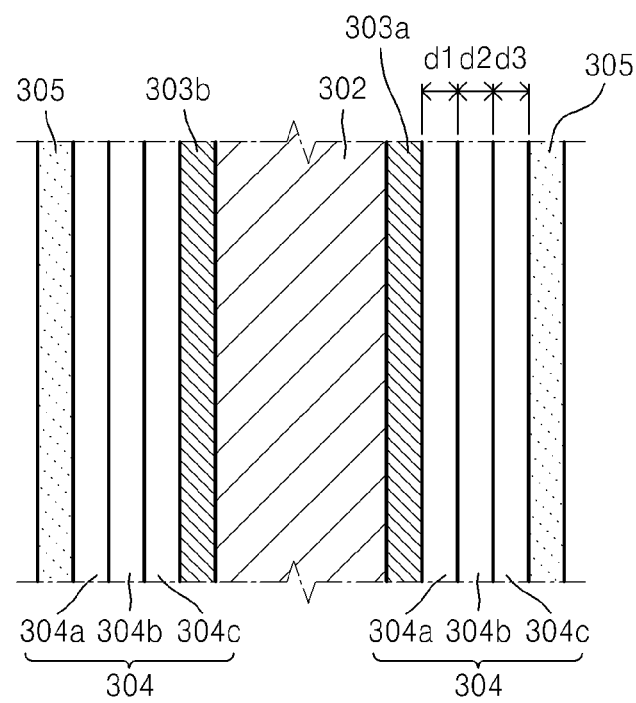
FIG. 4 is a schematic partial cross-sectional view illustrating a multilayer structure of a dielectric layer of FIG. 2.

The dielectric layer 304 may have a multilayer structure formed of a plurality of different materials to enable it to endure a pressure caused by shakes of the non-polar and polar liquids 308 and 309 and to prevent a chemical reaction with the non-polar and polar liquids 308 and 309. For example, FIG. 4 is a schematic cross-sectional view illustrating a multilayer structure of the dielectric layer 304. Referring to FIG. 4, the dielectric layer 304 includes a first layer 304a formed of a fluoropolymer CYTOP and adjacent to the hydrophobic coating 305, a second layer 304b formed of HfO2, and a third layer 304c formed of Mo and adjacent to the electrode 303a or 303b. Here, a thickness d1 of the first layer 304a is about 300 Å, a thickness d2 of the second layer 304b is about 2000 Å, and a thickness d3 of the third layer 304 is about 2000 Å.

The non-polar liquid 308 and the polar liquid 309 disposed in the space formed by the vertical barriers 302 have high transmissivities to transmit light without loss and have different refractive indexes to refract light at the interface between the liquids. Also, as shown in FIG. 2, a density of the non-polar liquid 308 may be higher than a density of the polar liquid 309, such that the non-polar liquid 308 is disposed in the space below the polar liquid 309. The non-polar liquid 308 and the polar liquid 309 may be formed of various types of materials to meet the above conditions. For example, the non-polar liquid 309 may be De-Ionized (DI) water including NaCl of about 0.005 M and sodium dodecyl sulface (SDS) of about 0.1 w %. The non-polar liquid 308 may also be bromonaphtalene or chloronaphtalene.

As shown in FIG. 2, the non-polar liquid 308, disposed at the bottom of the space formed by the vertical barriers 302, may be separately disposed in each electrowetting lens cell 300. However, the polar liquid 309, disposed at the top of the space may extend over all the electrowetting lens cells 300 of the electrowetting lens array 30. For this to happen, a predetermined space may be formed between a lower surface of the upper transparent substrate 311 and upper surfaces of the vertical barriers 302.

In the electrowetting lens cell 300 having the above-described structure, a contact angle between the interface of the non-polar liquid 309 and the polar liquid 308 and the vertical barriers 302 may be adjusted by a voltage applied to each of the first through fourth electrodes 303a through 303d. Therefore, if the voltage applied to each of the first through fourth electrodes 303a through 303d is appropriately adjusted, the interface between the non-polar liquid 308 and the polar liquid 309 may be changed to a flat slope, a flat horizontal plane, a convex surface, a concave surface, or the like. Also, a curvature of the convex surface or the concave surface may be adjusted.

Figure 5:
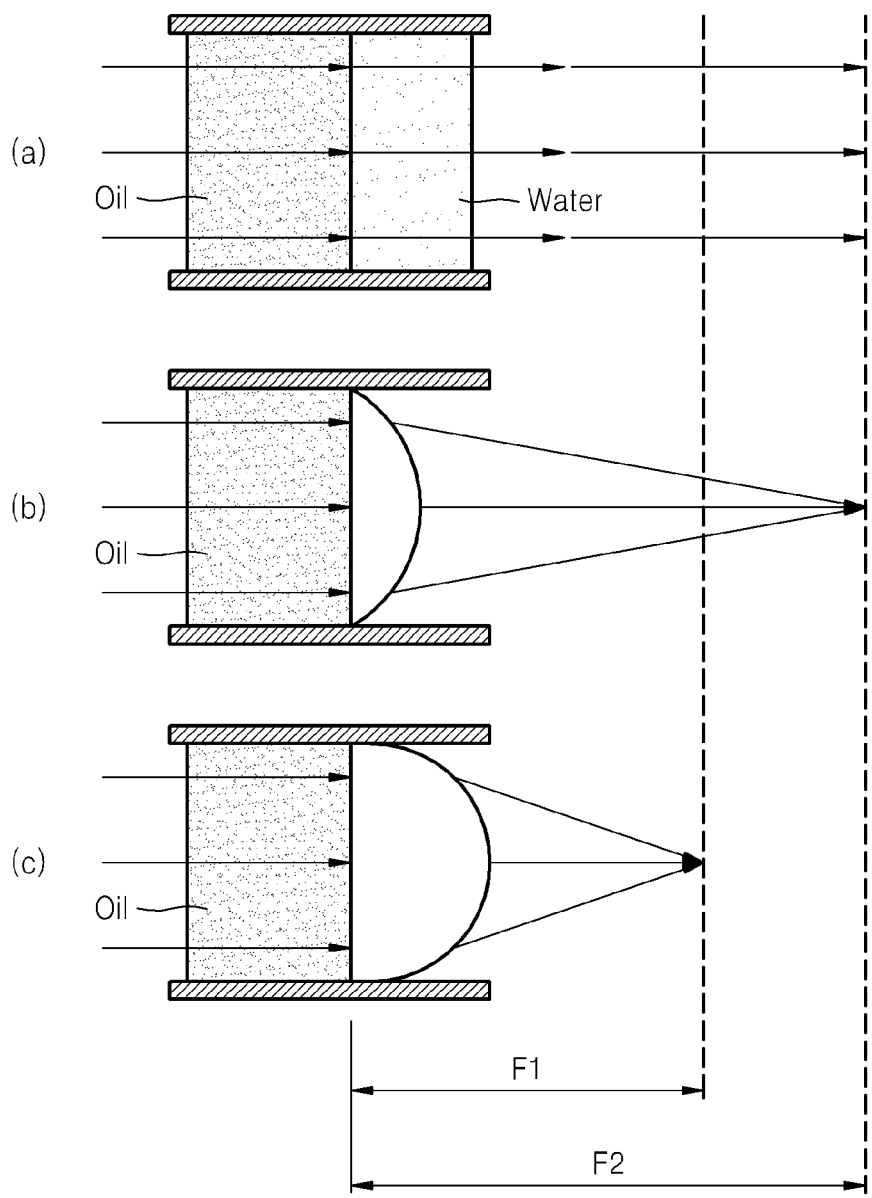
FIG. 5 is views illustrating an operation of an electrowetting lens cell of FIG. 2.

FIGS. 5(a) through 5(c) are views illustrating operations of the electrowetting lens cell 300. As shown in FIG. 5A, the interface between the polar liquid 309 and the non-polar liquid 309 may be a flat horizontal plane to allow the electrowetting lens cell 300 to transmit incident light without refracting the incident light. As shown in FIG. 5B, the interface between the polar liquid 309 and the non-polar liquid 309 may be adjusted to be a convex surface having a first focal distance F1. As shown in FIG. 5C, the interface between the polar liquid 309 and the non-polar liquid 309 may be adjusted to be a convex surface having a second focal distance F2.

In the present embodiment, to form the electrowetting lens array 30, a plurality of electrowetting lens cells 300 having the above-described structures are 2-dimensonally arrayed in a fly-eye lens array. Here, the electrowetting lens array 30 may be constituted so that the plurality of electrowetting lens cells 300 of the electrowetting lens array 30 correspond to a plurality of pixels of the display panel on one-to-one basis.

An exemplary operation of the 3D image display apparatus 10 will now be described.

Referring to FIG. 1, in the 3D image display apparatus 10, the display panel 20 sequentially displays at least two images I1 through I3 having different depths. The electrowetting lens array 30 projects the images I1 through I3 at at least two focal distances corresponding to the different depths of the images I1 through I3. For example, when the display panel 20 of the 3D image display apparatus 10 displays the first image I1, a focal distance of the electrowetting lens array 30 is adjusted to be the shortest in order to project the first image I1 on a first plane P1. When the display panel 20 displays the second image I2, the focal distance of the electrowetting lens array 30 is changed to be longer in order to project the second image I2 on a second plane P2. When the display panel 20 displays the third image I3, the focal distance of the electrowetting lens array 30 is changed to be much longer in order to project the third image I3 on a third plane P3. If 3D images of a frame are all displayed according to the above-described method, the display panel 20 displays a first image I1 of a next frame, and the electrowetting lens array 30 adjusts the focal distance thereof to be the shortest.

Three images I1 through I3 having different depths are displayed in FIG. 1. However, the number of images of different depths displayed in one frame and the order of the various focal distances may be altered. For example, if one image is displayed at a frame rate of about 60 Hz, and driving speeds of the display panel 20 and the electrowetting lens array 30 are each about 180 Hz or more, the 3D image display apparatus 10 may sequentially display, in one frame, at least three or more images having different depths. In this case, if the depth of one image is D, the 3D image display apparatus 10 according to the present embodiment may display a 3D image having a depth of 3×D or more.

Figure 6:
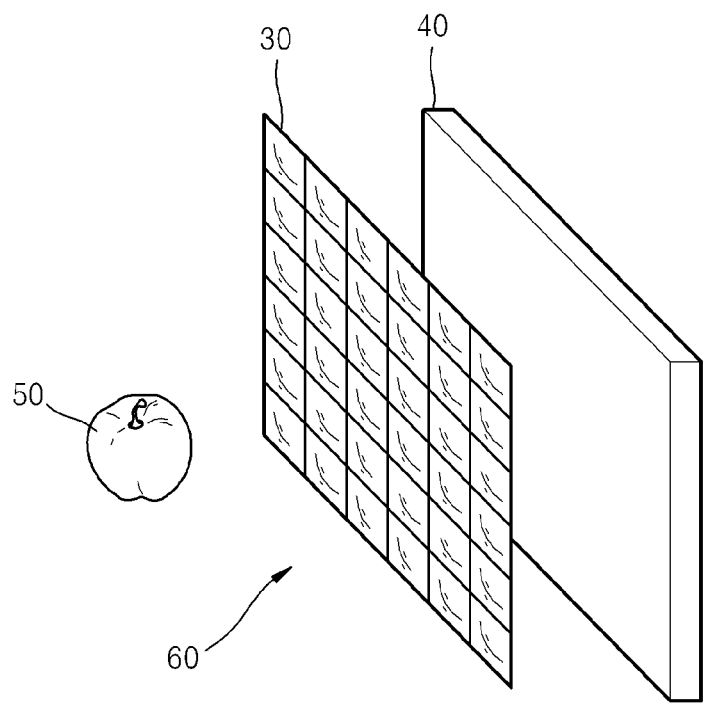
FIG. 6 is a schematic view illustrating a structure and an operation of a 3D image pickup apparatus according to an another exemplary embodiment.

The electrowetting lens array 30 may be used in a 3D image pickup apparatus for obtaining a 3D image to be displayed. FIG. 6 is a schematic view illustrating a structure and an operation of a 3D image pickup apparatus 60 according to an exemplary embodiment. Referring to FIG. 6, the 3D image pickup apparatus 60 includes an electrowetting lens array 30 having an electrically adjustable variable focal distance and an image pickup device 40. Here, the electrowetting lens array 30 may have the same structure and function as the electrowetting lens array 30 described above. The image pickup device 40 may be a charge-coupled device (CCD) image sensor or a complementary metal oxide semiconductor (CMOS) image sensor having a plurality of optical sensing pixels. For example, a plurality of electrowetting lens cells 300 of the electrowetting lens array 30 may correspond to the plurality of optical sensing pixels of the image pickup device 30 on a one-to-one basis.

The 3D image pickup apparatus 60 of FIG. 6 sequentially changes the focal distance of the electrowetting lens array 30 and forms an image of an object 50 on the image pickup device 40. The image pickup device 40 captures images of different depths of the object 50 respectively formed at different focal distances. Here, focal distances of the electrowetting lens array 30 changed when the 3D image pickup apparatus 60 captures a 3D image may match with focal distances of the electrowetting lens array 30 changed when the 3D image display apparatus 10 of FIG. 1 displays a 3D image.

It will be understood that the exemplary embodiments described herein are to be considered in a descriptive sense only and not for purposes of limitation. Descriptions of features or aspects within each embodiment will be considered as available for other similar features or aspects in other embodiments.

What is claimed is:

1. A 3-dimensional (3D) image display apparatus comprising:
    a display panel comprising a plurality of pixels; and
    an electrowetting lens array having an electrically adjustable variable focal distance,
    wherein the electrowetting lens array comprises a plurality of electrowetting lens cells 2-dimensionally arrayed in a fly-eye lens array, and
    wherein each of the plurality of electrowetting lens cells of the electrowetting lens array corresponds to one of the plurality of pixels of the display panel on a one-to-one basis.

2. The 3D image display apparatus of claim 1, wherein:
    the display panel is configured to sequentially display at least two images having different depths; and
    the electrowetting lens array is configured to sequentially project the at least two images at at least two different focal distances corresponding to the depths of the at least two images.

3. A 3-dimensional (3D) image display apparatus comprising:
    a display panel comprising a plurality of pixels; and
    an electrowetting lens array having an electrically adjustable variable focal distance,
    wherein the electrowetting lens array comprises a plurality of electrowetting lens cells 2-dimensionally arrayed in a fly-eye lens array, wherein:
    the display panel is configured to sequentially display at least two images having different depths;
    the electrowetting lens array is configured to sequentially project the at least two images at at least two different focal distances corresponding to the depths of the at least two images;
    when the display panel displays a first image having a first depth, the electrowetting lens array projects the first image at a first focal distance;
    when the display panel displays a second image having a second depth, the electrowetting lens array projects the second image at a second focal distance; and
    when the display panel displays a third image having a third depth, the electrowetting lens array projects the third image at a third focal distance.

4. A 3-dimensional (3D) image display apparatus comprising:
    a display panel comprising a plurality of pixels; and
    an electrowetting lens array having an electrically adjustable variable focal distance,
    wherein the electrowetting lens array comprises a plurality of electrowetting lens cells 2-dimensionally arrayed in a fly-eye lens array,
    wherein the display panel is configured to sequentially display at least two images having different depths;
    wherein the electrowetting lens array is configured to sequentially project the at least two images at at least two different focal distances corresponding to the depths of the at least two images; and
    wherein each of the electrowetting lens cells comprises:
        a lower transparent substrate and an upper transparent substrate;
        vertical barriers extending from an upper surface of the lower transparent substrate, wherein the vertical barriers define a plurality of spaces therebetween;
        a plurality of electrodes disposed on sidewalls of the vertical barriers;
        a dielectric layer which covers the plurality of electrodes;
        a hydrophobic coating disposed on a surface of the dielectric layer;
        a plurality of wiring lines disposed on the upper surface of the lower transparent substrate and respectively electrically connected to the plurality of electrodes;
        a common electrode disposed on a lower surface of the upper transparent substrate; and
        a non-polar and a polar liquid disposed in a space defined by the vertical barriers.

5. The 3D image display apparatus of claim 4, wherein:
    the vertical barriers are disposed in a mesh form and define the plurality of spaces therein; and
    the plurality of electrodes comprises a first electrode, a second electrode, a third electrode, and a fourth electrode, wherein the first electrode and the second electrode are disposed on opposite sides of vertical barriers extending in a first direction, and the third electrode and the fourth electrode are disposed on opposite sides of vertical barriers extending in a second direction perpendicular to the first direction, such that the first electrode and the second electrode face each other across each of the plurality of spaces and the third electrode and the fourth electrode face each other across each of the plurality of spaces.

6. The 3D image display apparatus of claim 4, wherein the dielectric layer comprises a multilayer structure comprising a plurality of different materials.

7. The 3D image display apparatus of claim 6, wherein the dielectric layer comprises a first layer formed of a fluoropolymer and adjacent to the hydrophobic layer, a second layer formed of $HfO_2$, and a third layer formed of Mo and adjacent to the electrodes.

8. The 3D image display apparatus of claim 7, wherein a thickness of the first layer is about 300 Å, a thickness of the second layer is about 2000 Å, and a thickness of the third layer is about 2000 Å.

9. A 3D image pickup apparatus comprising:
    an image pickup device comprising a plurality of optical sensing pixels; and
    an electrowetting lens array having an electrically adjustable variable focal distance, wherein the electrowetting lens array comprises a plurality of electrowetting lens cells 2-dimensionally arrayed in a fly-eye lens array, and wherein each of the plurality of electrowetting lens cells of the electrowetting lens array correspond to one of the plurality of optical sensing pixels of the image pickup device.

10. The 3D image pickup apparatus of claim 9, wherein the electrowetting lens array is configured to sequentially change the focal distance and form an image of an object on the image pickup device, wherein the image pickup device configured to capture a plurality of images of different depths of the object at different focal distances.

11. An electrowetting lens array comprising:

a plurality of electrowetting lens cells arranged in a 2-dimensional fly-eye lens array, each of the electrowetting lens cells comprising:

a lower transparent substrate and an upper transparent substrate, a plurality of vertical barriers extending from an upper surface of the lower transparent substrate, and defining a space therebetween, a first electrode disposed on a sidewall of a first vertical barrier extending in a first direction, a second electrode disposed on a sidewall of a second vertical barrier extending in the first direction, a third electrode disposed on a sidewall of a third vertical barrier extending in a second direction, different from the first direction, and a fourth electrode disposed on a sidewall of a fourth vertical barrier extending in the second direction, wherein the first and second electrode face each other across the space and the third and fourth electrodes face each other across the space, a dielectric layer covering the first electrode, the second electrode, the third electrode, and the fourth electrode, a hydrophobic coating disposed on the dielectric layer, a non-polar liquid and a polar liquid disposed in the space, wherein a shape of an interface between the non-polar liquid and the polar liquid is changed by application of a voltage to one or more of the first electrode, the second electrode, the third electrode, and the fourth electrode.

* * * * *